United States Patent
Green et al.

(10) Patent No.: US 6,369,746 B1
(45) Date of Patent: Apr. 9, 2002

(54) SIMULTANEOUS NULLING IN LOW SIDELOBE SUM AND DIFFERENCE ANTENNA BEAM PATTERNS

(75) Inventors: Leon Green, Newton; Joseph Preiss, Westford; Kai-Chiang Chang, Northborough, all of MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/615,904

(22) Filed: Jul. 13, 2000

(51) Int. Cl.[7] .............................. G01S 7/36; G01S 13/44
(52) U.S. Cl. .............................. 342/16; 342/17; 342/80; 342/149; 342/152; 342/162; 342/194; 342/379
(58) Field of Search .............................. 342/13, 16, 17, 342/18, 80, 89, 149, 152, 153, 154, 159, 162, 194, 195, 198, 379, 382

(56) References Cited

U.S. PATENT DOCUMENTS

| 4,044,359 | A | | 8/1977 | Applebaum | |
|---|---|---|---|---|---|
| 4,168,500 | A | * | 9/1979 | Brassaw | 342/149 |
| 4,555,706 | A | * | 11/1985 | Haupt | 342/81 |
| 4,672,378 | A | * | 6/1987 | Drabowitch et al. | 342/17 |
| H792 | H | | 6/1990 | Sanval et al. | 342/17 |
| 5,128,679 | A | | 7/1992 | Moffat | 342/13 |
| 5,302,961 | A | * | 4/1994 | Murrow et al. | 342/427 |
| 5,359,329 | A | * | 10/1994 | Lewis et al. | 342/17 |
| 5,600,326 | A | * | 2/1997 | Yu et al. | 342/17 |
| 5,847,675 | A | * | 12/1998 | Poinsard | 342/81 |
| 5,892,478 | A | * | 4/1999 | Moss | 342/149 |
| 5,952,965 | A | | 9/1999 | Kowalski | 342/372 |
| 6,141,371 | A | * | 10/2000 | Holmes et al. | 375/130 |

\* cited by examiner

*Primary Examiner*—John B. Sotomayor
(74) *Attorney, Agent, or Firm*—Daly, Crowley & Mofford, LLP (57) ABSTRACT

A radar system includes a null processor coupled to transmit receive modules. The null processor inserts nulls in the sum pattern at locations for suppressing a jamming source. The null processor determines the difference pattern based upon the product: sum*sin(x), where sum is the sum pattern and x is the azimuth angle.

14 Claims, 9 Drawing Sheets

SIMULTANEOUS NULLING IN LOW SIDELOBE SUM AND DIFFERENCE ANTENNA BEAM PATTERNS

STATEMENT REGARDING FEDERALLY SPONSORED RESEARCH

The government may have certain rights in the invention pursuant to Contract No. N39997-99-9-375A, awarded by sponsoring agency Naval Sea Systems Support Detachment.

FIELD OF THE INVENTION

The present invention relates generally to radar, and more particularly, to radar systems having jamming suppression features.

BACKGROUND OF THE INVENTION

While radars can be highly effective in ascertaining the location of remote objects, the accuracy of radars can be greatly reduced in the case where a radar is jammed. As is well known to one of ordinary skill in the art, radars generally transmit energy at predetermined frequencies and receive energy reflected back from one or more targets. As is also well known, a radar system may be jammed by a remote signal source that intentionally creates the appearance of a false target or by transmitting large amounts of energy intended to saturate a radar receiver.

Many attempts have been made to suppress jamming of radars. In one known technique, nulls are formed in the radiation pattern in positions corresponding to the location of the jamming or interfering source. However, when it is desired to form a null in a sum beam, and in a difference beam, conventional radar systems require so-called subarray control modules to provide additional degrees of freedom. More particularly, since a transmit/control module typically controls only one channel (sum or difference) at a time, the subarray control modules are required to place nulls in the difference pattern at locations that correspond to the nulls in the sum pattern.

Such subarray control modules have several significant disadvantages. For example, each module is subject to hardware failures that can significantly degrade radar performance. In addition, the modules must amplify large signals without introducing non-linearities into the system and thus require unique and costly components.

It would, therefore, be desirable to provide a radar system that enhances the anti-jamming ability of a monopulse radar system by introducing nulls in sum and difference patterns without the need for subarray control modules.

SUMMARY OF THE INVENTION

The present invention provides a monopulse radar system that suppresses jamming of the radar. In an exemplary embodiment, a radar system includes a null processor that provides a null in the sum beam at a location that corresponds to an identified jamming source. The null processor then forms a difference pattern from a product of the sum pattern and the sin of the angle error, i.e., sum*sin(x). The resultant difference pattern has a null in a location that corresponds to the jammer null in the sum beam. Thus, both the sum and difference beams of the system have nulls in the same location.

Forming the difference pattern from the sum pattern and the sin of the angle error eliminates the need for subarray control modules to place nulls in the difference pattern that correspond to the nulls in the sum pattern. Thus, the radar system provides advanced jamming suppression features while reducing the cost and complexity as compared with conventional radar systems having subarray control modules to provide additional degrees of freedom for the difference beam.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
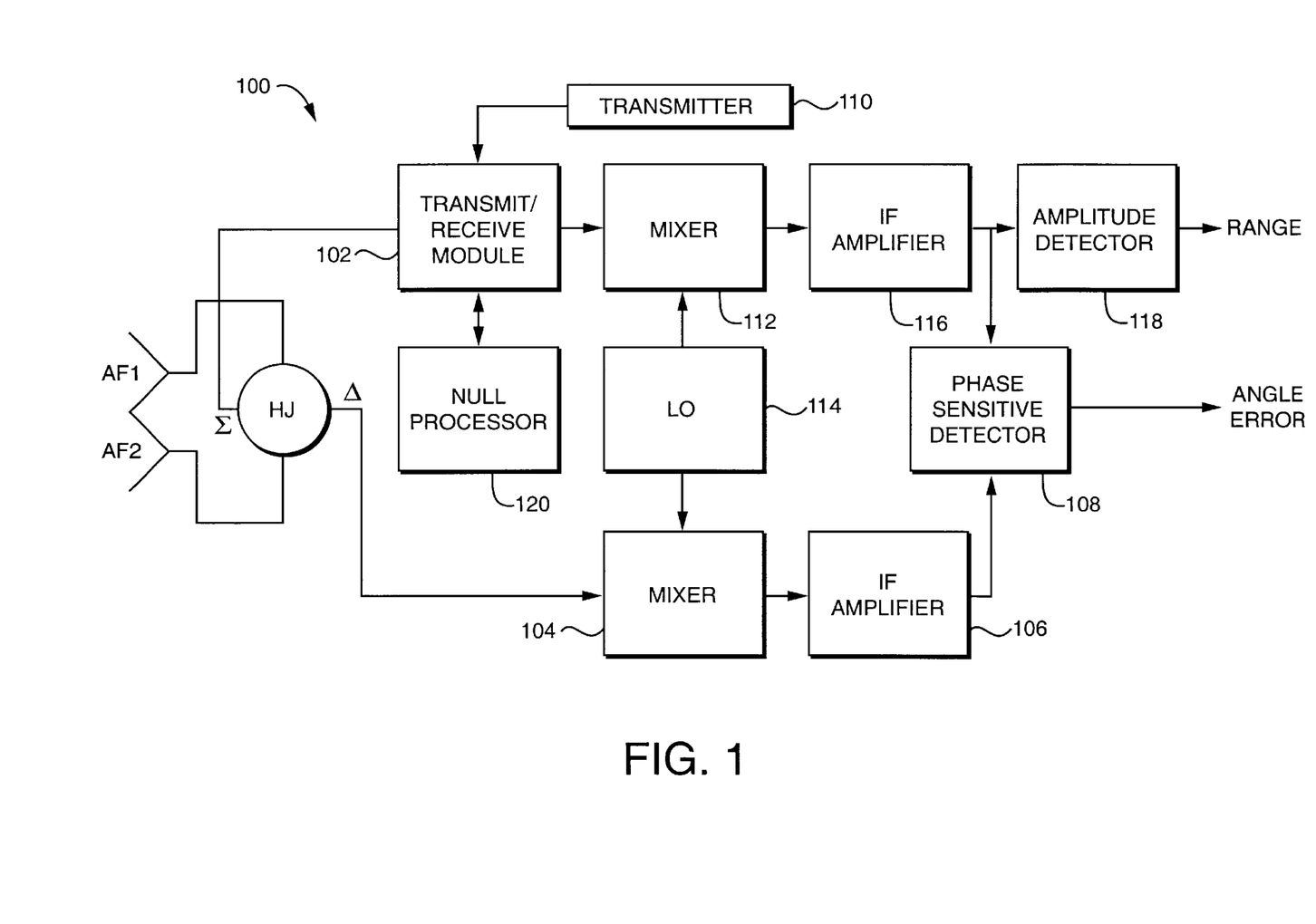
FIG. 1 is a schematic representation of a monopulse radar in accordance with the present invention.

FIG. 1 shows an exemplary embodiment of a monopulse radar 100 in accordance with the present invention for providing range and angle information for a target. The radar 100 includes a plurality of antenna feeds AF1, AF2, which can comprise antenna subarrays, coupled to a hybrid junction HJ. Sum and difference signal paths extend from the hybrid junction such that the sum signal path Σ is connected to a transmit/receive module 102 and the difference signal path Δ is connected to a difference channel mixer 104. The difference channel mixer 104 is connected to a difference channel IF amplifier 106, which is coupled to a phase sensitive detector 108.

The transmit/receive module 102 is coupled to a transmitter 110 and a sum channel mixer 112. A local oscillator 114 is coupled to the sum channel mixer 112 and the difference mixer 104. A sum channel IF amplifier 116 is connected to an amplitude detector 118 and to the phase sensitive detector 108. The amplitude detector 118 provides range information and the phase sensitive detector 108 provides angle error information.

A null processor 120 coupled to the transmit/receive module 102 determines the difference pattern based on the sum pattern, as described below, so that a null at a jammer location in the sum pattern will also appear in the difference pattern. This arrangement provides control over the difference pattern nulls without requiring so called subarray control modules to achieve additional degrees of freedom.

Figure 2A:
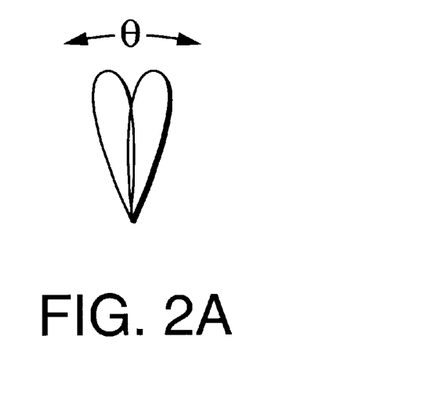
FIGS. 2A is pictorial representation of exemplary overlapping radiation patterns used by the radar system of FIG. 1.
Figure 2B:
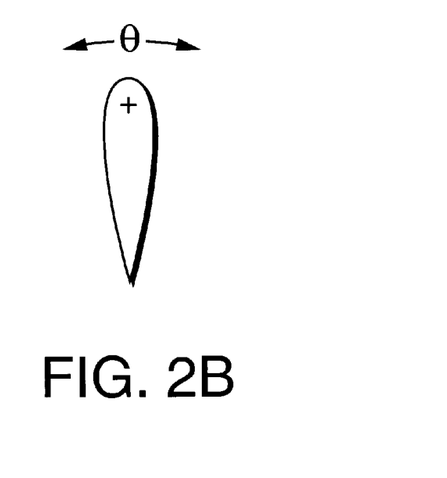
FIG. 2B is a pictorial representation of an exemplary sum pattern used by the radar system of FIG. 1.
Figure 2C:
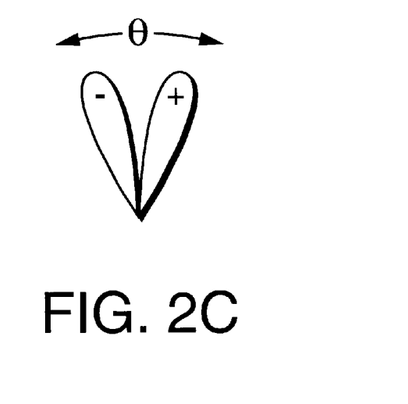
FIG. 2C is a pictorial representation of an exemplary difference pattern used by the radar system of FIG. 1.
Figure 2D:
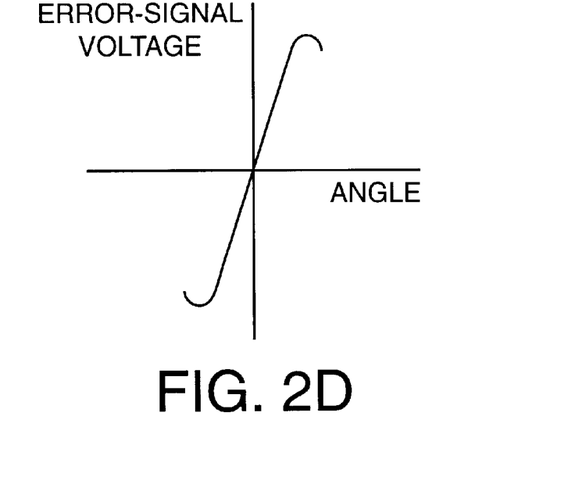
FIG. 2D is a pictorial representation of an exemplary plot of error-angle voltage with respect to time.

The monopulse radar 100 utilizes overlapping antenna patterns, such as those shown in FIG. 2A, to obtain range and one coordinate, e.g., azimuth, angular error information from a single pulse. The resultant sum pattern signal, shown in FIG. 2B, provides range information and a reference for the sign, i.e., direction, of the azimuth angle error. The difference pattern signal, shown in FIG. 2C, provides the magnitude of the angular error. The sum and difference signals are amplified separately in the respective IF amplifiers 116, 106 and combined in the phase sensitive detector 108 to produce an error-signal characteristic such as that shown in FIG. 2D. The output of the phase sensitive detector 108 is an angular error signal that is proportional to the angular error and to the direction.

Figure 3:
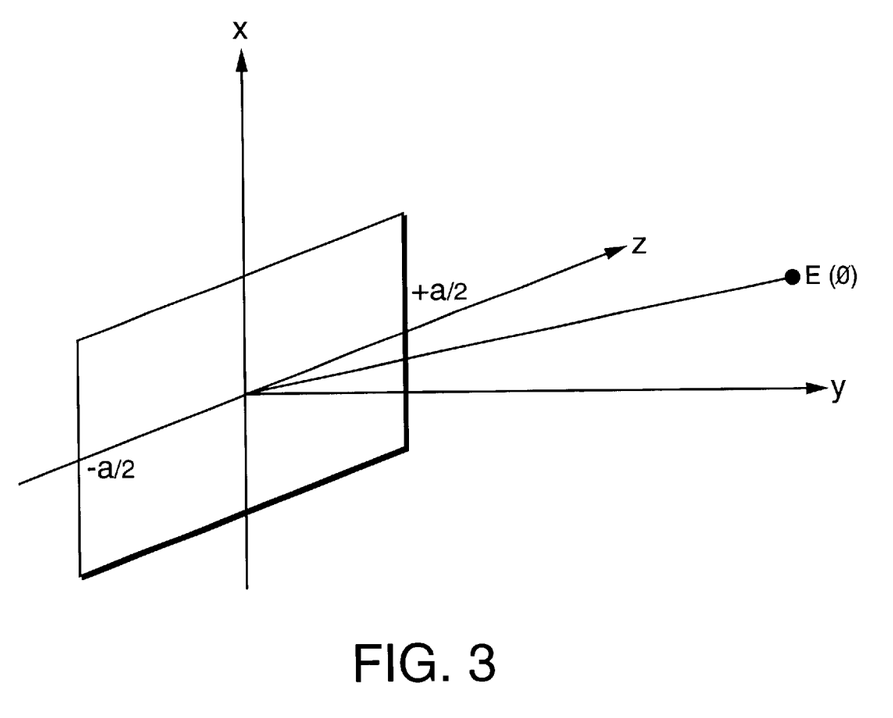
FIG. 3 is a pictorial representation of the relationship between an antenna aperture, which can form a part of the radar system of FIG. 1, and far-field electric-field intensity.

FIG. 3 illustrates the relationship between an exemplary aperture distribution and the far-field electric field intensity pattern. As known to one of ordinary skill in the art, the field intensity pattern ($E(\phi)$) over the antenna aperture is given by Equation (1) below:

$$E(\phi) = \int_{-a/2}^{a/2} A(z) \exp\left(j2\pi \frac{z}{\lambda} \sin\phi\right) dz \quad \text{(Equation 1)}$$

where $E(\phi)$ is the far field intensity pattern of the antenna, $A(z)$ is the aperture distribution, $a$ is the width of the aperture, and $\phi$ is the angle in the y-z plane as measured from the y plane. The aperture distribution $A(z)$ for a given field intensity given by Equation 2 below:

$$A(z) = \frac{1}{\lambda} \int_{-\infty}^{\infty} E(\phi) \exp\left(-j2\pi \frac{z}{\lambda} \sin\phi\right) d(\sin\phi) \quad \text{(Equation 2)}$$

As known to one of ordinary skill in the art, antenna pattern synthesis should optimize the distribution of energy about an antenna aperture. The aperture illumination is tapered, i.e., lower at the aperture edges, so as to decrease the sidelobes. By decreasing the sidelobes, the radar is less susceptible to jamming. However, tapering of the aperture illumination must be balanced against concomitant decreases in gain. Gain refers to the ability of an antenna to concentrate energy in a particular direction.

It is understood that a variety of tapered patterns can be used in illuminating an antenna to reduce sidelobes. Exemplary patterns include Taylor, Woodward-Levinson, Dolph-Chebyshev, and cosecant-squared. As known to one of ordinary skill in the art, each such pattern represents a particular technique in achieving low sidelobe illumination. By manipulating certain parameters associated with each of the pattern types, the desired illumination characteristics can be achieved.

Figure 4A:
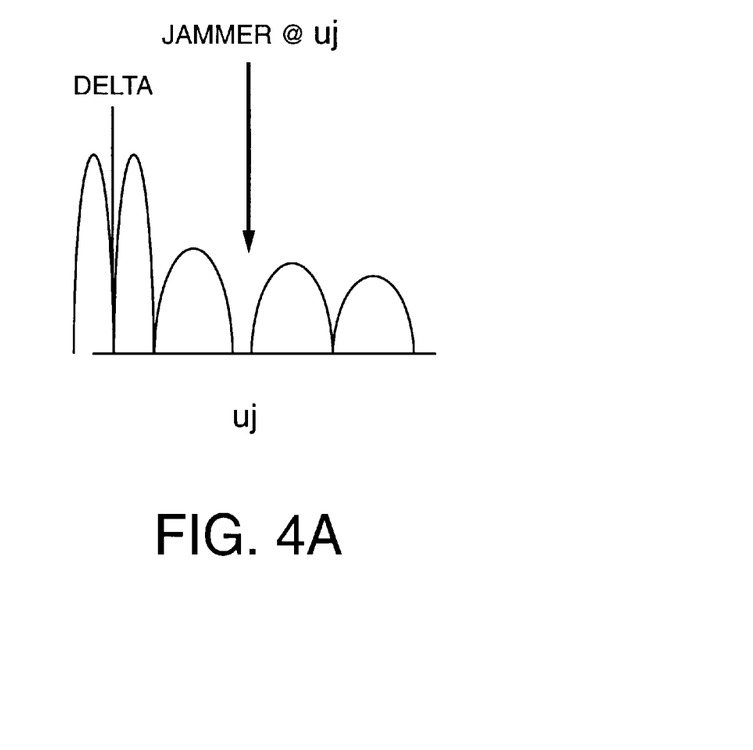
FIG. 4A is a schematic representation of an antenna portion of the radar of FIG. 1.

FIG. 4A shows an exemplary embodiment of an array system 200 in accordance with the present invention. The array system 200 includes a plurality of antenna elements 202a–n that form part of a phased array antenna. As known by one of ordinary skill in the art, a phased array radar is a directive antenna having individual radiating elements that generate a radiation pattern or antenna beam having a shape and direction determined by the relative phases and amplitudes of the currents at the individual radiating elements. By varying the phase, the antenna beam can be steered to a desired direction. In addition, subarrays comprising a subset of the radiating elements can be used to generate multiple independent beams from a single aperture. The antenna elements 202 are coupled to corresponding transmit/receive modules 204a–n, each of which includes an amplifier 206 and a phase shifter 208. A null processor 210 is coupled to the transmit/receive modules 204 for controlling the phase shifters 206 and the amplifiers 208.

In response to the radar receiving a jamming signal, the null processor 210 introduces a null into the sum pattern at desired locations using conventional techniques for pattern synthesis. More particularly, by adjusting the phase and/or amplitude of the transmit/receive modules the nulls in the antenna pattern can be produced in particular angular directions.

Figure 4B:
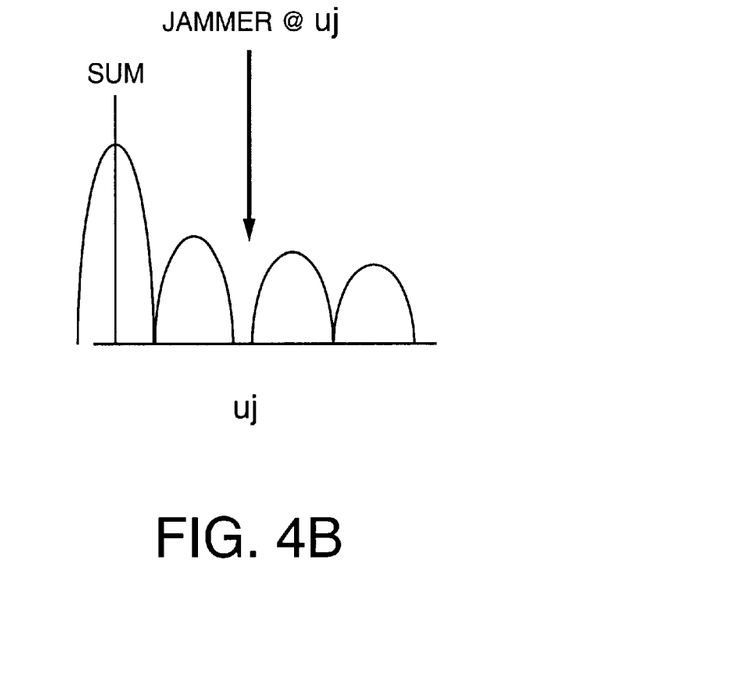
FIG. 4B is a graphical depiction of a sum pattern formed in accordance with the present invention.

FIG. 4B is a graphical depiction of a sum pattern formed in accordance with the present invention. In one embodiment, a Taylor distribution is used to synthesize the sum pattern. As understood by one of ordinary skill in the art, a Taylor pattern produces uniform sidelobes of a predetermined value in the vicinity of the main beam. The Taylor sidelobes decrease outside a specified angular region. For a Taylor distribution, where the sidelobe level is uniform within the region defined by $|(d/\lambda)\sin\phi| < \hat{\eta}$, and decreases for $\hat{\eta}$, and where d is the antenna aperture dimension, $\hat{\eta}$ should be at least three. While larger values of $\hat{\eta}$ may narrow the beamwidth, there may be significant loss in gain.

By adjusting the phase excitation of the Taylor type sum pattern, an antenna pattern is synthesized so as to form a null at angle $\mu_j$ corresponding to a jammer source. Further nulls are placed at locations $(\mu_j + \mu_0)$ and $(\mu_j - \mu_0)$, where $\mu_0 = \lambda/D$ (wavelength/aperture size). Nulls at these locations null the jammer at location $\mu_j$ in the sum beam. The technique for providing nulls in the same locations of the difference beam is described below.

Figure 4C:
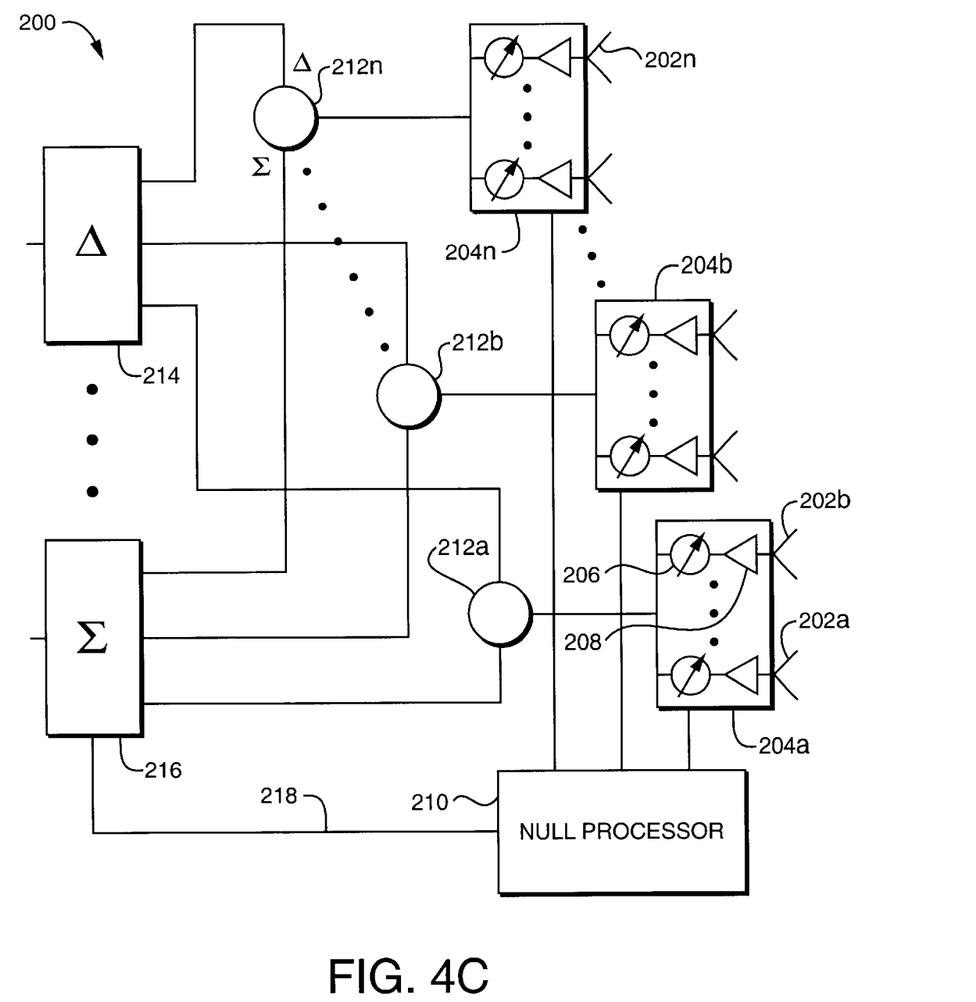
FIG. 4C is a graphical depiction of a difference pattern formed in accordance with the present invention.

FIG. 4C is a graphical depiction of a difference pattern in formed in accordance with the present invention. After placing nulls in the sum beam as described above, the difference beam can be formed so as to also have a null at azimuth angle $\mu_j$. In one embodiment, the null processor 210 synthesizes a difference excitation that corresponds to the product of the sum pattern and the sin of the azimuth angle. The general relationship is shown below in Equation (1):

$$\text{difference excitation} = \text{sum} * \sin(x) \quad (1)$$

The resultant difference pattern produced by this distribution is the difference between two sum beams that are displaced from the center $\mu_0$ by a value equal to the signal wavelength $\lambda$ divided by the antenna aperture size D, i.e., $\mu_0 = \lambda/D$. By forming the difference pattern in this way, a single transmit/receive module can control the sum and beam patterns.

Figure 4D:
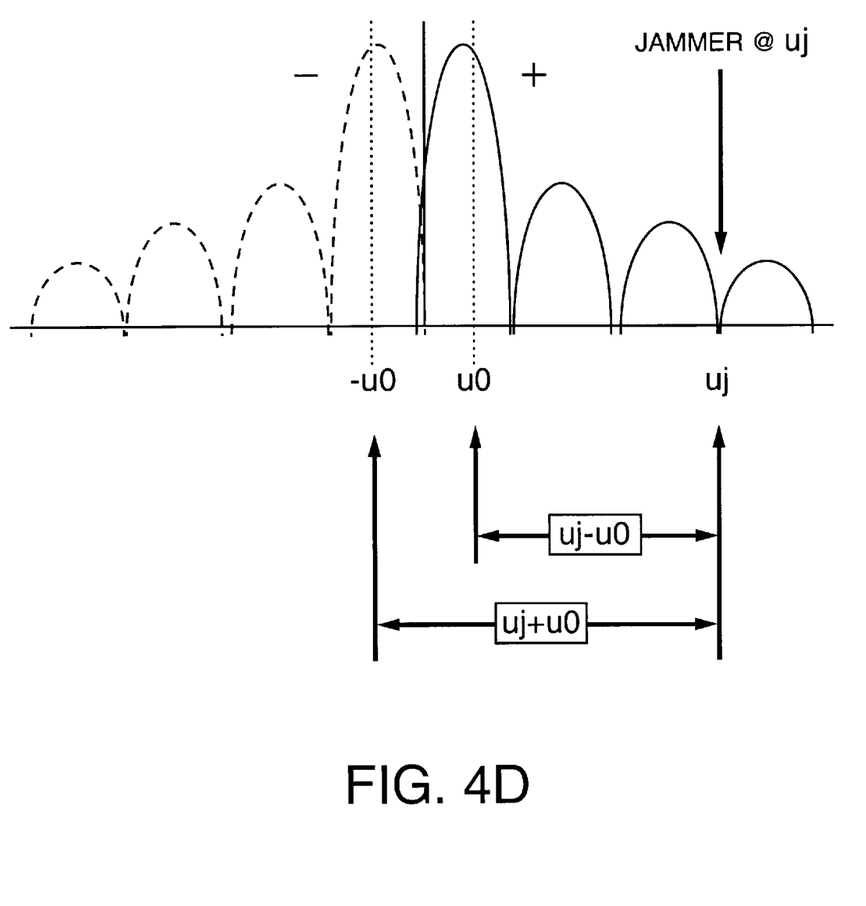
FIG. 4D is another graphical depiction of a difference pattern formed in accordance with the present invention.

FIG. 4D is another graphical depiction of a difference pattern formed in accordance with the present invention. Changes to the sum pattern are reflected in the difference pattern. Because the difference pattern is the difference of two sum beams, placing additional nulls in the sum beam results in a null in the difference pattern. Thus, the general approach is to place three nulls in the sum beam at locations $\mu_j$ (nulls jammer in the sum beam) and also at locations $(\mu_j + \mu_0)$ and $(\mu_j - \mu_0)$ in the sum beam. Together, the nulls at locations $(\mu_j + \mu_0)$ and $(\mu_j - \mu_0)$ of the sum beam result in nulls the jammer at $\mu_j$ in the difference beam.

Figure 5:
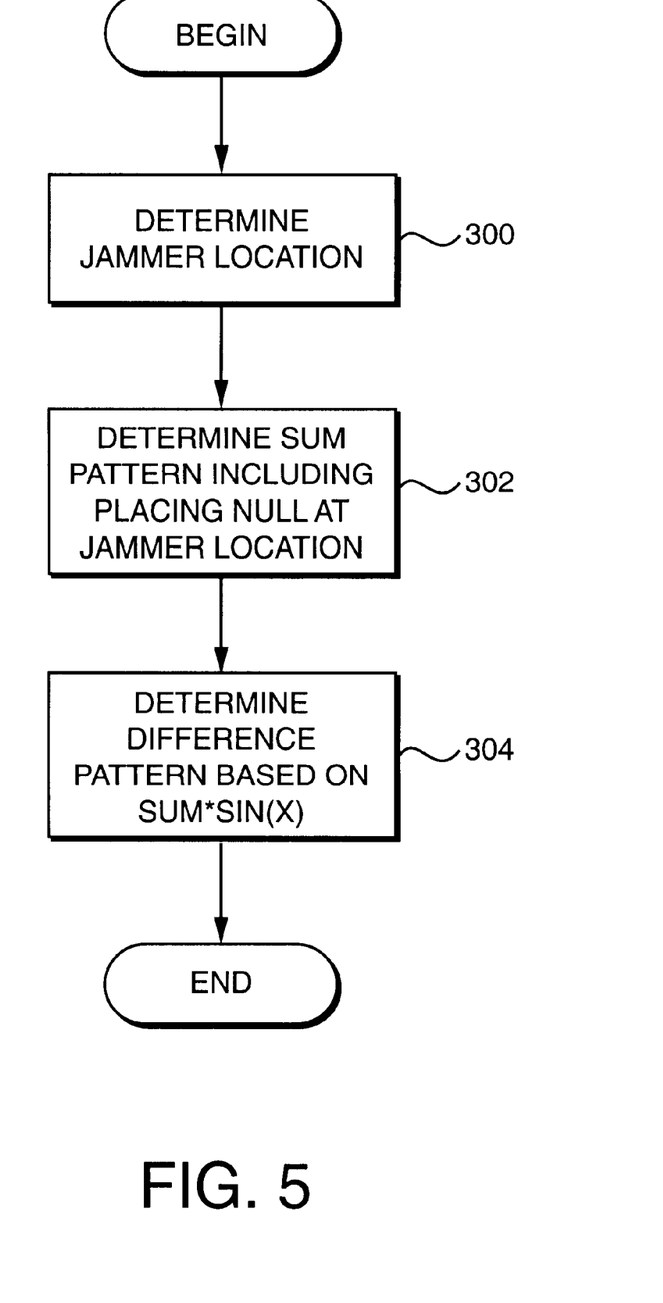
FIG. 5 is a flow diagram of an exemplary sequence of steps for forming a difference pattern in accordance with the present invention.

FIG. 5, taken in conjunction with FIGS. 4A–D, shows an exemplary sequence of steps for forming a difference pattern from a sum pattern in accordance with the present invention. In step 300, the null processor 210 determines a null location corresponding to a jamming source. The null processor 210 computes the location of N nulls in the sum pattern based upon the jamming source in step 302. More particularly, a null is placed at an angle corresponding to the identified jamming location. In step 304, the null processor 210, determines a difference pattern from the product of the sum pattern and the sin(x), where x corresponds to the azimuth angle. In one embodiment, for a null at location $\mu_j$, the null processor also places nulls in the sum pattern at $\mu_j-\mu_0$ and $\mu_j+\mu_0$, where $\mu_0$ is the wavelength divided by the aperture size. The resultant difference pattern has nulls at locations that correspond to those in the sum pattern.

By forming the difference pattern in this way, subarray control modules provide additional control, e.g., degrees of freedom, over the transmit/receive modules are not required to separately form a null in the difference pattern at a jammer location that corresponds to the null in the sum pattern.

Figure 6:
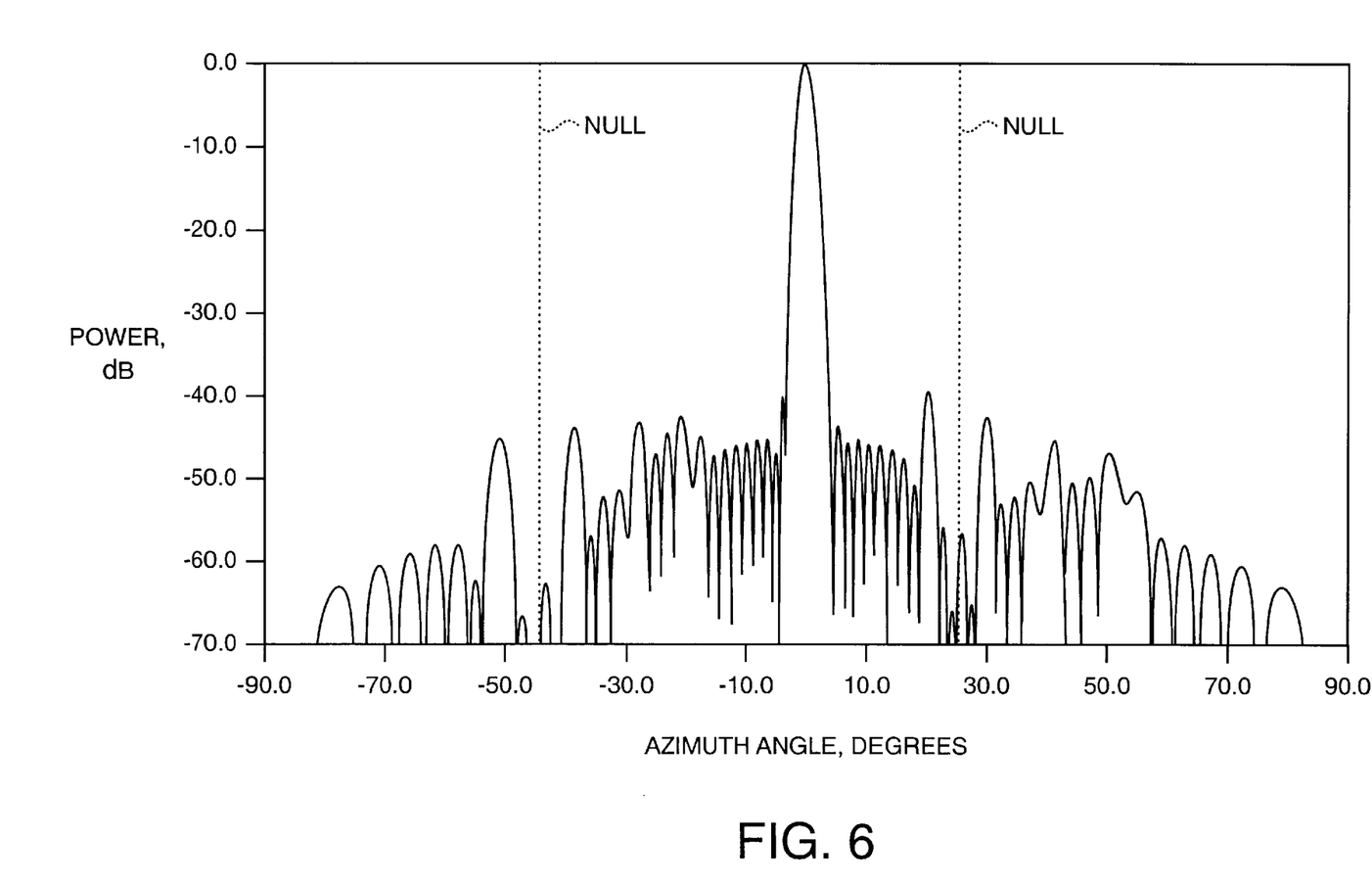
FIG. 6 is a graphical representation of an exemplary sum pattern generated by the radar of FIG. 1.
Figure 7:
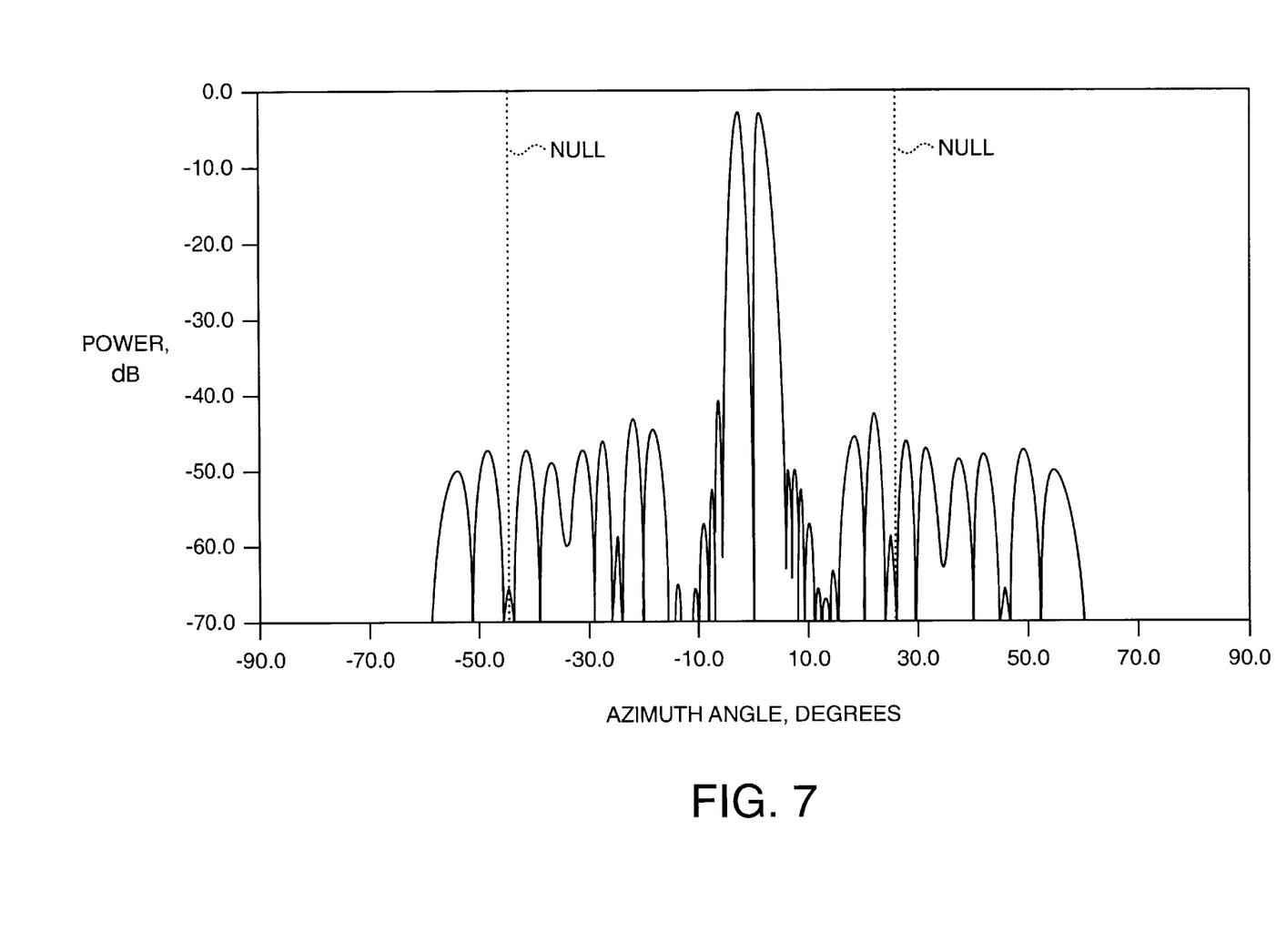
FIG. 7 is a graphical representation of an exemplary difference pattern generated by the radar of FIG. 1.

FIGS. 6 and 7 show exemplary sum and difference patterns formed in accordance with the present invention. FIG. 6 shows a notched monopulse pattern having a 45 db Taylor distribution sum pattern. The sum pattern has nulls at azimuth angles of about 25 degrees and about −45 degrees, which correspond to jammer sources. FIG. 7 shows a difference pattern derived from the sum pattern in accordance with the present invention, i.e., the product of the $\text{sum}_{Taylor}$ pattern and the sin of the azimuth angle. Like the sum pattern, the difference pattern has nulls at azimuth angles of about 25 degrees and about −45 degrees.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of forming a difference beam in a monopulse radar system, comprising:
    determining a first jamming source location;
    determining a sum pattern having at least one null that corresponds to the first jamming source location; and
    determining a difference pattern based upon a product of the sum pattern and the sin of the azimuth angle.

2. The method according to claim 1, wherein the at least one null in the sum pattern includes at least three nulls.

3. The method according to claim 1, wherein the at least one null in the sum pattern includes nulls at $\mu_j$, $\mu_j-\mu_0$, and $\mu_j+\mu_0$.

4. The method according to claim 1, further including using a Taylor distribution in determining the sum pattern.

5. The method according to claim 1, further including inserting a null in the sum pattern and in the difference pattern at a predetermined angle without utilizing subarray control modules.

6. The method according to claim 1, further including inserting additional nulls in sum and difference patterns corresponding to a second jamming source location.

7. The method according to claim 1, further including providing a phased array antenna for forming the sum pattern.

8. The method according to claim 1, further including selecting a sum pattern distribution from the group consisting of Taylor, Woodward-Levinson, Dolph-Chebyshev, and cosecant-squared.

9. The method according to claim 1, further including providing a null processor for coupling to a transmit/receive module for controlling the sum and difference patterns.

10. A method of suppressing effects of a jamming source in a monopulse radar, comprising:
    determining a location of the jamming source;
    determining a sum pattern in relation to azimuth angle, the sum pattern having a null corresponding to the jamming source location;
    determining a difference pattern in relation to the azimuth angle from the sum pattern multiplied by the sin of the azimuth angle.

11. A monopulse radar system, comprising:
    an antenna;
    a sum channel coupled to the antenna;
    a difference channel coupled to the antenna;
    a null processor for inserting nulls into a sum pattern in response to a jamming source and for generating a difference pattern corresponding to the product of the sum pattern and the sin of the azimuth angle.

12. The radar system according to claim 11, wherein the null processor forms at least three nulls in the sum pattern.

13. The radar system according to claim 11, wherein the antenna is a phased array antenna.

14. The radar system according to claim 11, wherein the null processor forms nulls in the sum pattern at $\mu_j$, $\mu_j-\mu_0$, and $\mu_j+\mu_0$.

* * * * *